US006850227B2

(12) United States Patent
Takahashi et al.

(10) Patent No.: US 6,850,227 B2
(45) Date of Patent: Feb. 1, 2005

(54) WIRELESS KEYBOARD

(75) Inventors: Nobuyuki Takahashi, Fujisawa (JP); Masaru Fukui, Fujisawa (JP); Naoyuki Miyazaki, Fujisawa (JP)

(73) Assignee: Minebea Co., Ltd., Kitasaku-gun (JP)

( * ) Notice: Subject to any disclaimer, the term of this patent is extended or adjusted under 35 U.S.C. 154(b) by 287 days.

(21) Appl. No.: 10/278,789

(22) Filed: Oct. 24, 2002

(65) Prior Publication Data

US 2003/0080944 A1 May 1, 2003

(30) Foreign Application Priority Data

Oct. 25, 2001 (JP) ........................................ 2001-327630

(51) Int. Cl.[7] ................................................ G09G 5/00
(52) U.S. Cl. ........................ 345/169; 345/168; 341/22; 700/84
(58) Field of Search ................................ 345/156, 168, 345/169, 158; 341/21, 22, 26; 700/84, 85, 86

(56) References Cited

U.S. PATENT DOCUMENTS

| | | | | |
|---|---|---|---|---|
| 4,501,938 A | * | 2/1985 | Kawauchi | ................... 200/5 A |
| 6,138,050 A | * | 10/2000 | Schneider et al. | ............ 700/84 |
| 6,791,478 B2 | * | 9/2004 | Lo | ................ 341/22 |
| 2002/0138162 A1 | * | 9/2002 | Lee et al. | ...................... 700/84 |
| 2003/0137460 A1 | * | 7/2003 | Chiu | .......................... 343/702 |
| 2003/0197677 A1 | * | 10/2003 | Hulvey | ........................ 345/156 |
| 2004/0037053 A1 | * | 2/2004 | Akita et al. | .................. 361/752 |

FOREIGN PATENT DOCUMENTS

| | | | | | |
|---|---|---|---|---|---|
| JP | 02002287875 A | * | 10/2002 | ............. | G06F/3/02 |
| JP | 405094252 A | * | 4/2003 | ............. | G06F/3/02 |

* cited by examiner

*Primary Examiner*—Amare Mengistu
(74) *Attorney, Agent, or Firm*—Nath & Associates PLLC; Gary M. Nath; Gregory B. Kang

(57) ABSTRACT

In a wireless keyboard including an antenna wire for radiating a keyboard output signal from a transmitting section into the air and an electrode sheet secured in a keyboard casing and having an electrically conductive pattern coated thereon, the conductive pattern constituting a part of a switch which is turned on by depressing a key, the antenna wire is formed such that an electrically conductive pattern is coated on the electrode sheet in a manner similar to the electrically conductive pattern constituting a part of the switch. The antenna wire is formed at the same time as the electrically conductive pattern constituting a part of the switch and integrally with the electrode sheet.

2 Claims, 5 Drawing Sheets

WIRELESS KEYBOARD

BACKGROUND OF THE INVENTION

1. Field of the Invention

The present invention relates to a keyboard, and more particularly to a wireless keyboard used as an input device for a personal computer (hereinafter, referred to as a PC), a workstation or a word processor.

2. Description of the Related Art

Keyboards are most commonly used as devices for inputting characters, numerals and symbols to electronic devices, particularly to information-processing devices such as PCs hereinafter, referred to as a PC main body for convenience).

While such keyboards are generally connected to PC main bodies via cables, various peripherals including keyboards and pointing devices such as mice are also connected to the PC main bodies, so that cables for connecting them are often complicated, causing troubles for deskwork frequently.

Therefore, recently, peripherals connected to the PC main bodies have become wireless (cableless). Among them, since keyboards need to be connected to the PC main bodies in most cases, it is particularly effective to use wireless keyboards.

A keyboard in which wireless transmission is performed is called a wireless keyboard, which is different from a common keyboard in which a transmitting section for a keyboard output signal (in the case of one-way transmission from the keyboard to the PC main body) and antenna wire are added thereto.

Here, while the antenna wire is absolutely necessary to radiate the keyboard output signal from the transmitting section into the air, an antenna wire of a wireless keyboard is disposed in a keyboard casing, as shown in FIG. 8.

In other words, an antenna wire 22 is housed in a keyboard casing 21 and is arranged beyond the keyboard and in the vicinity of a location at which function keys and the like (not shown) are linearly arranged, in such a way that both ends thereof are connected to an output end of a transmitting section 23 and the center thereof is routed in the form of a loop along the keyboard layout, that is, in the longitudinal direction (horizontal direction in the drawing). An area 24 indicated by a two-dot chain line in FIG. 8 denotes a keyboard layout area.

Such an arrangement of the antenna wire 22 is adopted for the following reason. The keyboard consumes a large amount of electric power unlike a pointing device (not shown) such as a mouse. Thus, it is necessary to decrease the power consumption as much as possible for performing wireless transmission, in other words, for achieving the battery power operation.

Accordingly, a low-loss antenna is required. In order to radiate radio waves from the antenna with low loss, it is necessary to perform antenna matching, for example, to set the length of the antenna to an efficiently resonating wavelength or to insert a shorter circuit to further reduce the length.

Actually, the antenna wire 22 is routed in the form of a loop along the longitudinal direction of the keyboard casing 21 so that a maximum length of the antenna can be determined in the keyboard casing 21, as shown in FIG. 8.

In the conventional wireless keyboard, however, routing of the antenna wire 22 is troublesome. Particularly, when an electrically conductive wire with a coating of insulation such as a vinyl resin is used, kinking or curling of the coating occurs in the loop, thus hindering positioning thereof, which is troublesome.

This also means that even if the loop of the antenna wire 22 is positioned with a proper spacing w, it may become deformed or moved to decrease or partly eliminate the spacing w due to impacts to the keyboard casing 21.

Accordingly, it has been necessary to save the time and trouble of routing the antenna wire and to maintain the spacing w.

SUMMARY OF THE INVENTION

The present invention is made in the light of the above problems. Accordingly, it is an object of the invention to provide a wireless keyboard capable of saving the time and trouble of routing an antenna wire, maintaining a spacing between the wires, and reducing costs.

In order to achieve the above object, a wireless keyboard according to a first aspect of the invention comprises an antenna wire for radiating a keyboard output signal into the air from a transmitting section, or radiating the keyboard output signal into the air from the transmitting section and receiving a keyboard input signal radiated into the air at a receiving section; an insulating electrode sheet having electrically conductive patterns coated thereon, each pattern constituting a part of a switch which is turned on by the depression of each key; and a keyboard casing, wherein the antenna wire is formed of an electrically conductive pattern coated on the electrode sheet.

A wireless keyboard according to a second aspect of the invention comprises an antenna wire for radiating a keyboard output signal into the air from a transmitting section, or radiating the keyboard output signal into the air from the transmitting section and receiving a keyboard input signal radiated into the air at a receiving section; an insulating electrode sheet having electrically conductive patterns coated thereon, each pattern constituting a part of a switch which is turned on by the depression of each key; and a keyboard casings wherein the antenna wire is formed of an electrically conductive pattern coated on an insulating sheet disposed adjacent to the electrode sheet.

According to the first aspect of the invention, the antenna wire is formed of an electrically conductive pattern coated on the electrode sheet. In other words, the antenna wire is formed integrally on the electrode sheet secured in the keyboard casing, so that kinks, curling, deformation and displacement of the antenna wire cannot occur, thus the trouble of routing the antenna wire is eliminated completely.

With such an arrangement, the spacing between the wires at the center of the loop of the antenna wire can be increased.

Moreover, the antenna wire can be coated on the existing electrode sheet together with the electrically conductive pattern forming a part of the switch, thereby reducing costs significantly.

According to the second aspect of the invention, the antenna wire is formed of an electrically conductive pattern coated on the insulating sheet disposed adjacent to the electrode sheet. In other words, the antenna wire is formed integrally on the sheet-like member (insulating sheet) similarly to the electrode sheet, so that kinks, curling, deformation and displacement of the antenna wire cannot occur, thus the trouble of routing the antenna wire is eliminated completely, as in the case of the first aspect of the invention.

Also, the spacing between the wires at the center of the loop of the antenna wire can be increased.

Furthermore, since the antenna wire is formed on the sheet-like member (insulating sheet) similarly to the electrode sheet, there is an advantage in that they can be treated in the same way in terms of managing or assembling parts, thereby reducing costs.

DESCRIPTION OF THE PREFERRED EMBODIMENTS

Embodiments of the present invention will be described with reference to the drawings.

Figure 1:
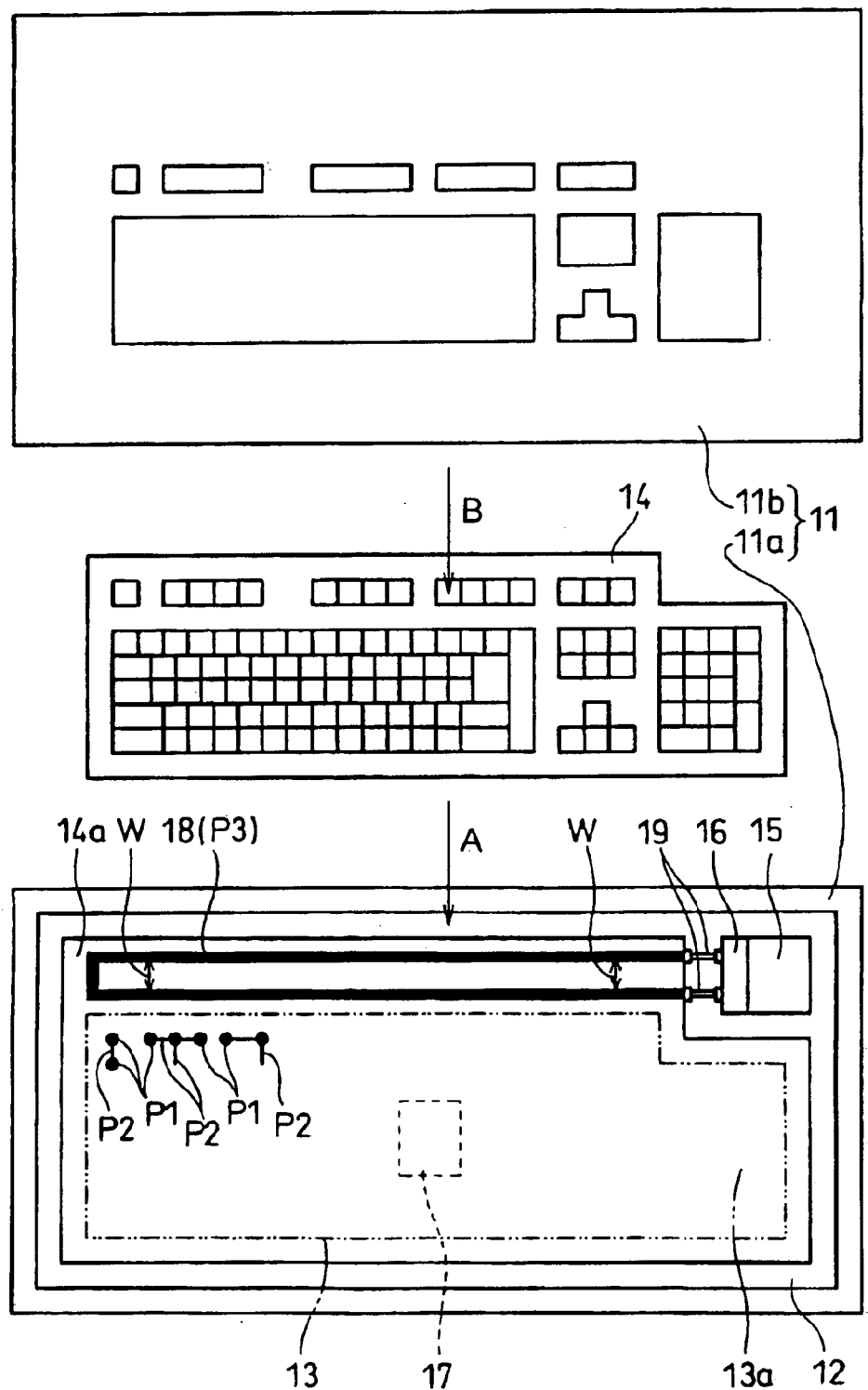
FIG. 1 is an exploded plan view in schematic form of a wireless keyboard according to a first embodiment of the present invention.

FIG. 1 is an exploded plan view in schematic form of a first embodiment of a wireless keyboard according to the present invention.

As show in the drawing, a keyboard casing 11 is mainly constituted by a bottom casing 11a and an upper casing 11b, and a supporting plate 12 is secured on the inside of the bottom casing 11a. The supporting plate 12 is formed to be larger than a keyboard layout area 13 and supports a keyboard layout structure 14 at a lower corresponding position (on the bottom casing 11a side). The use of an electrically conductive metal plate as the supporting plate 12 is useful-to reinforce the keyboard casing 11 which is made of a synthetic resin, to act as an anti-electrostatic mechanism, and to shield against electromagnetic interference.

In the drawing, arrows A and B denote that the keyboard layout structure 14 is secured within the bottom casing 11a and the upper casing 11b is combined with the bottom casing 11a so as to cover the keyboard layout structure 14.

The keyboard layout structure 14 includes a plurality of keys (a key group) arranged in positions corresponding to characters, numerals and symbols and a switch group turned on by depressing each key.

The keyboard layout structure 14 includes a membrane switch in this case.

The membrane switch includes the key group formed on an electrode sheet having nodes and wiring patterns (electrically conductive patterns) coated on an insulating film (a polyester film) by screen-printing. As the membrane switch, there are one-layer types, two-layer types and three-layer types. The one-layer switch is formed using a key having an electrically conductive rubber in combination therewith. The three-layer switch is formed such that a pair of the electrode sheets oppose each other while sandwiching a spacer sheet made of a polyester film. The two-layer switch is formed such that a space-maintaining layer corresponding to the spacer sheet of the three-layer switch is coated on a suitable position of a surface of either of the electrode sheets, which is opposite to the other electrode sheet, by printing or the like.

In the drawing, reference numeral 14a denotes an electrode sheet in the above-mentioned membrane sheet. This electrode sheet is the lowermost electrode sheet of the three-layer type membrane switch in this case, and electrically conductive node patterns P1 and wiring patterns P2 are coated thereon by screen-printing or the like.

The electrode sheet 14a constitutes a part of the keyboard layout structure 14 as described above, which is shown in a state in which it is positioned on the bottom casing 11a for the purpose of explanation. Only part of the node patterns P1 and the wiring patterns P2 is shown in the drawing and actually they are formed over substantially the whole area of the electrode sheet 14a which corresponds to the keyboard layout area 13.

A controller 15 for generating a keyboard output signal corresponding to a depression from each key and a transmitting section 16 to which the generated keyboard output signal is inputted are secured at the upper side in the drawing (beyond the keyboard), above a numeric keypad layout area in the bottom casing 11a at which numeric keys are arranged.

A storage section 17 for a battery (not shown) for supplying a direct current to the controller 15 and the transmitting section 16 is formed at a suitable position in the bottom casing 11a in such a way that the battery can be removed from the back of the bottom casing 11a.

To the transmitting section 16 is connected an antenna wire 18 for radiating the keyboard output signal (high-frequency signal) into the air via electrically conductive wires, for example, shielded wires 19. The antenna wire 18 is a loop antenna in the drawing and is arranged along the longitudinal direction of the keyboard.

The antenna wire 18 and the transmitting section 16 may be connected to each other using a removable connector (not shown), alternatively a connecting structure (not shown) may be adopted in which a male terminal on the antenna wire 18 side is pressed and inserted into a female terminal on the transmitting section 16 side to press and hold the male terminal into the female terminals.

In this case, the antenna wire 18 is constituted by an electrically conductive pattern coated on the electrode sheet 14a. Hereinafter, the electrically conductive pattern is referred to as an antenna wire pattern P3. The antenna wire pattern P3 is formed on the electrode sheet 14a at the same time as the formation of the electrically conductive node pattern P1 and the wiring pattern P2. Such patterns P1 to P3 are coated on the electrode sheet 14a by screen-printing.

As described above, according to the invention, the antenna wire 18 is constituted by the electrically conductive patterns coated on the electrode sheet 14a which is secured within the keyboard casing 11. In other words, the antenna wire 18 is integrally fixed on the electrode sheet 14a secured in the keyboard casing 11.

Accordingly, kinks, curling, deformation and displacement of the antenna wire 18 cannot occur, thus the trouble of routing the antenna wire is eliminated completely.

Also, it is useful for increasing the spacing w between the wires at the center of the loop of the antenna wire 18.

In other words, when the antenna wire 18 is integrated with the electrode sheet 14a secured in the keyboard casing 11, the antenna wire 18 does not move freely, thereby causing no deformation or slack.

Furthermore, an increase in the spacing w resulting from the above means that the spacing w cannot be decreased due to the deformation or displacement of the loop of the antenna wire 18 when an impact is applied to the keyboard casing 11 during the period from when the antenna wire 18 is positioned at a proper spacing w until shipment or after.

While the above embodiment has been described in the case where the antenna wire pattern P3 is formed on the lowermost electrode sheet 14a of the three-layer membrane switch, the present invention is not limited thereto.

For example, it may be formed on the uppermost layer of the three-layer membrane switch or on the electrode sheet of the one-layer membrane switch. Also, the invention is applicable to an electrode sheet other than the membrane switch, such as an FPC (flexible printed circuit). In all cases, any insulating electrode sheet on which an electrically conductive pattern constituting a part of a switch to be turned on by the depression of each key is coated can exert a similar effect to that of the above embodiment irrespective of the layer on which the antenna wire pattern P3 is coated.

Furthermore, it is possible to form the antenna wire pattern P3 on both the uppermost and the lowermost electrode sheet of the three-layer membrane switch, connect them in parallel, and then connect them to the transmitting section 16. In this case, the gain of the antenna can be increased.

Figure 2:
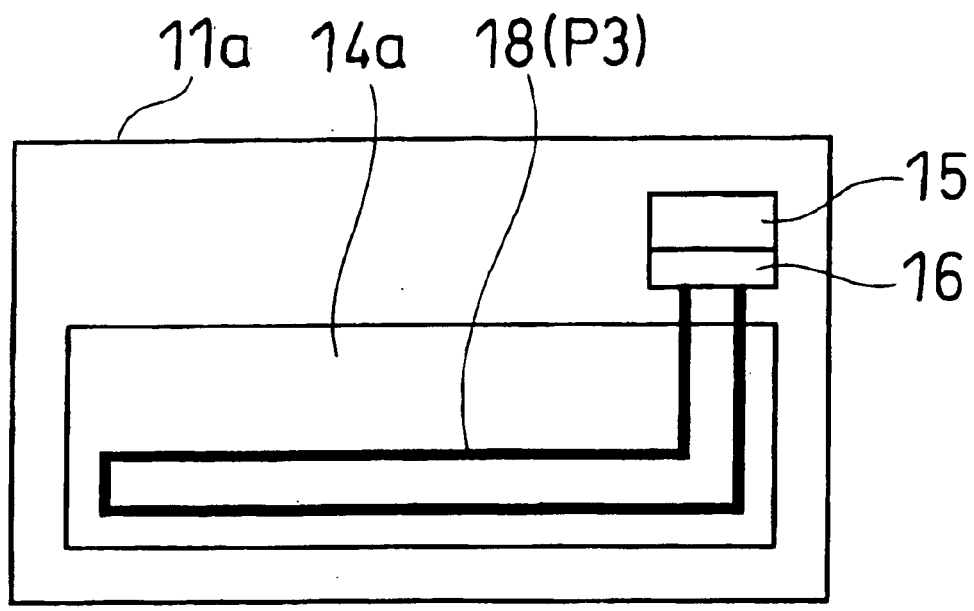
FIG. 2 is a schematic plan view of a first modification of the first embodiment of the wireless keyboard.

Also, the antenna wire pattern P3 may be formed on the opposite side to that of the embodiment in the drawing, that is, on the electrode sheet 14a on the lower side in FIG. 1 of the keyboard (refer to FIG. 2). With such an arrangement of the antenna wire pattern P3, an armrest portion of a keyboard having an armrest (not shown) can be utilized effectively. In particular, there is a recent trend to increase the number of various function keys at the upper part of the electrode sheet 14a in the drawing, so that it is becoming difficult to obtain a space for the antenna wire pattern P3 to be coated. In such a case, the armrest portion is effective to obtain space for the antenna wire pattern P3.

Figure 3:
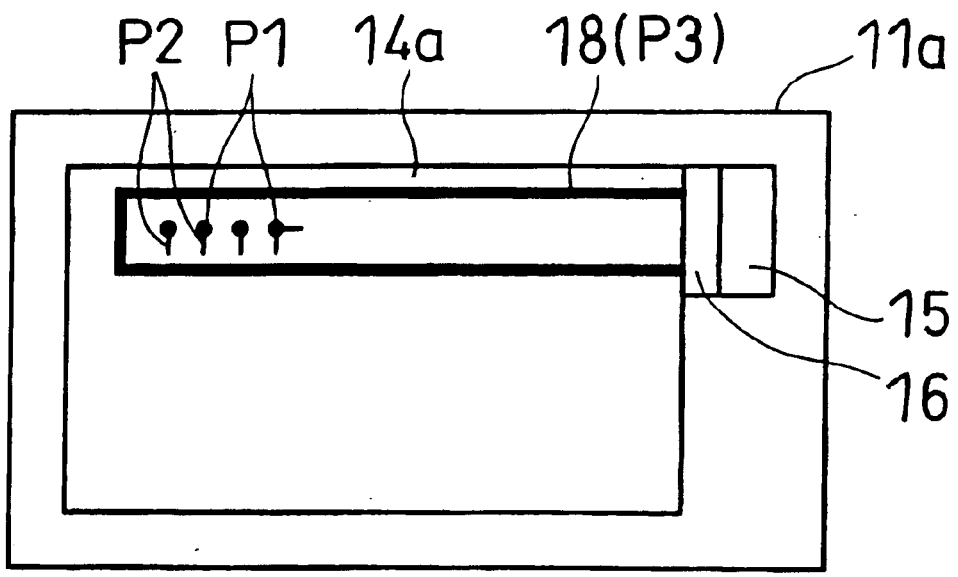
FIG. 3 is a schematic plan view of a second modification of the first embodiment of the wireless keyboard.

Also possible is a configuration in which the node pattern P1 and the wiring pattern P2 exist inside the antenna wire pattern P3 (refer to FIG. 3).

Figure 4:
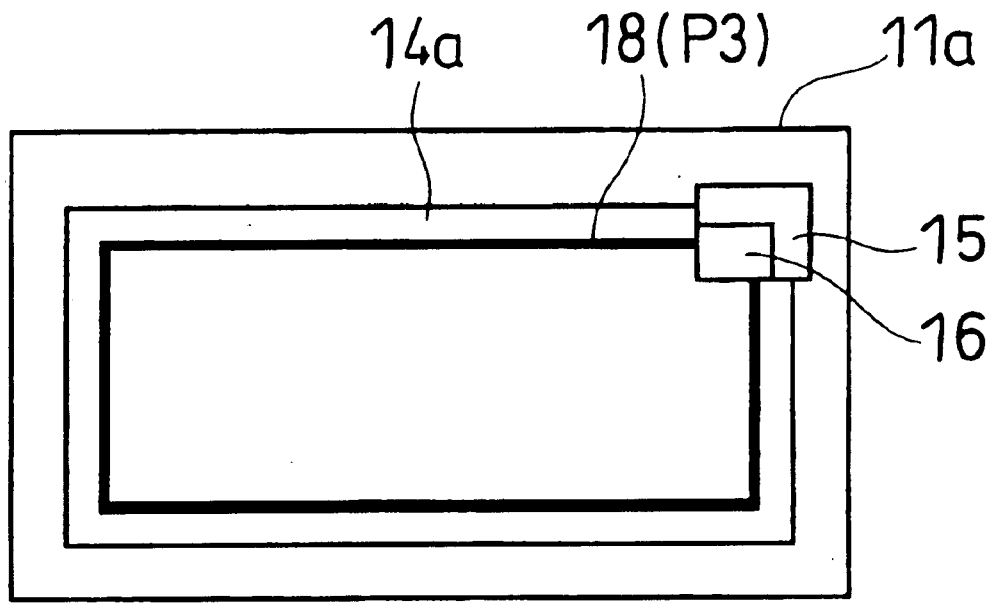
FIG. 4 is a schematic plan view of a third modification of the first embodiment of the wireless keyboard.

Furthermore, the antenna wire pattern P3 is not formed only along the longitudinal direction of the keyboard, but may be formed along the outside periphery of the electrode sheet 14a (refer to FIG. 4).

The antenna wire pattern P3 may be formed on a surface of the electrode sheet 14a which is opposite to the surface having the node pattern P1 and the wiring pattern P2 formed thereon.

Figure 5:
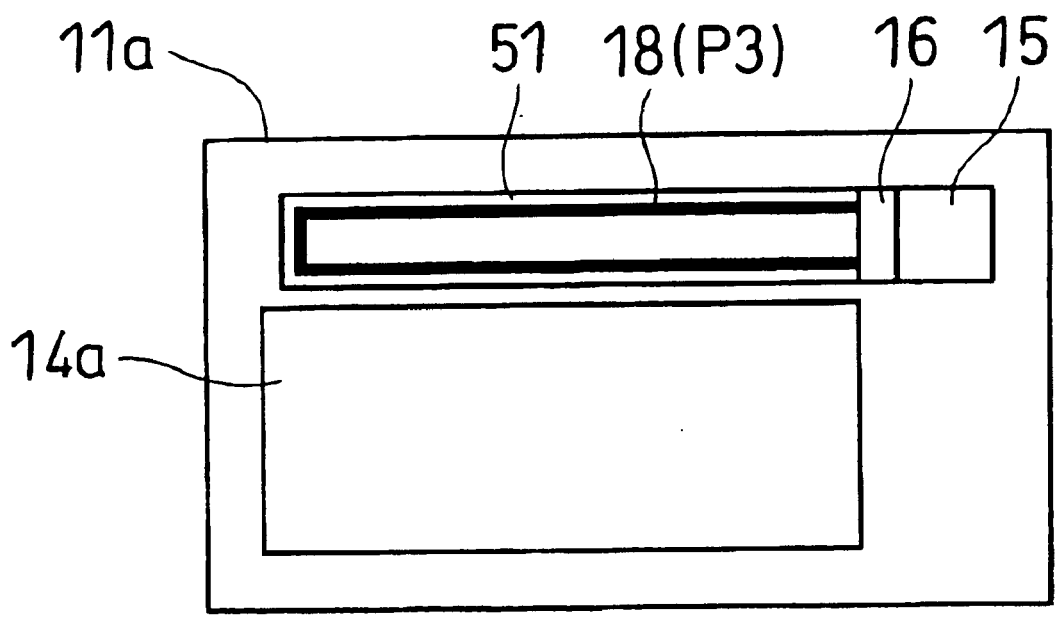
FIG. 5 is a schematic plan view of a second embodiment of a wireless keyboard according to the present invention.
Figure 6:
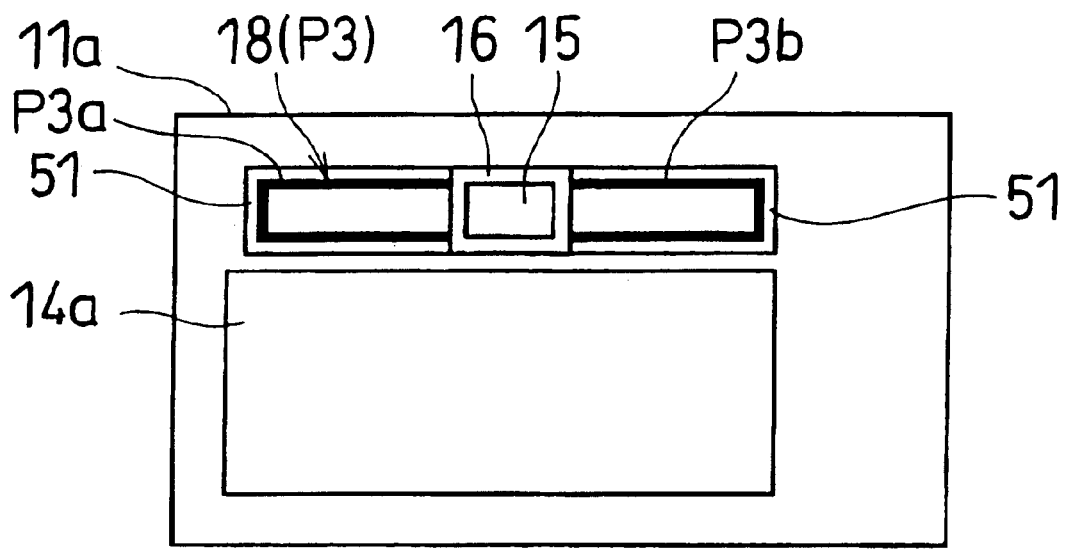
FIG. 6 is a schematic plan view of a first modification of the second embodiment of the wireless keyboard.
Figure 7:
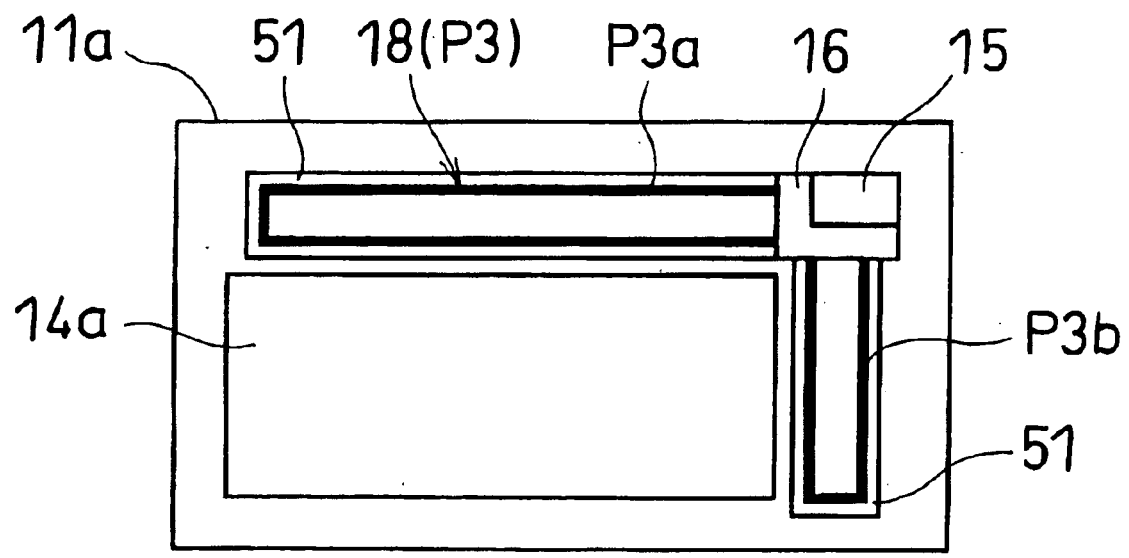
FIG. 7 is a schematic plan view of a second modification of the second embodiment of the wireless keyboard.
Figure 8:
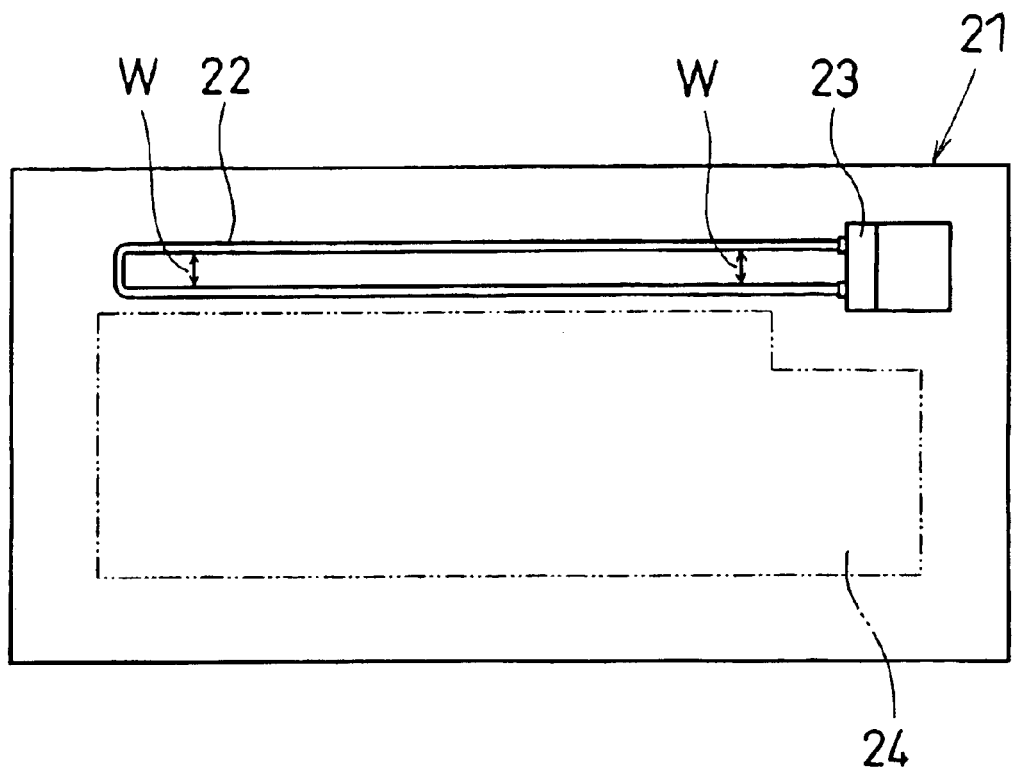
FIG. 8 is a plan view of an essential part of a conventional wireless keyboard.

Also, the antenna wire pattern P3 may be formed on an insulating sheet, such as a membrane sheet separate from the electrode sheet 14a. FIGS. 5 to 7 show embodiments thereof in which the antenna wire pattern P3 is formed on an insulating sheet 51 separate from the electrode sheet 14a. FIGS. 6 and 7 show the cases in which the antenna wire pattern P3 is divided into two parts shown by symbols P3a and P3b.

Also in the embodiments shown in FIGS. 5 to 7, since kinks, deformation and displacement do not occur in the antenna wire pattern P3, as in the case where it is formed on the electrode sheet 14a, the trouble of routing the antenna wire is eliminated completely. Also, since the antenna wire pattern P3 is formed on the sheet-like member (insulating sheet 51) similar to the electrode sheet 14a, it can be treated in the same way as the electrode sheet 14a in terms of managing and assembling tools, thus it is useful to reduce costs.

In each case shown in FIGS. 1 to 7, an insulating layer may be formed on the antenna wire pattern P3 by screen-printing with an insulating ink or coating an insulating sheet thereon. Accordingly, the antenna wire pattern P3 can be prevented from being brought into contact with other electrical conductors in the keyboard casing 11 (refer to FIG. 1).

In the above embodiments, although only the transmission of a signal (one-way transmission) from the keyboard to the PC main body is described, the present invention is not limited thereto. The transmission of signals (two-way transmission) may be performed at both the keyboard and the PC. In this case, the transmitting section 16 is replaced by a transceiver (not shown), and the antenna wire in the above embodiments is also used for both transmission and reception of signals. In any case, a receiving section or a transceiver, which is coupled with the above-mentioned transmitting section or the transceiver, is connected to the PC main body (a keyboard terminal of the PC main body).

In the above-described drawings, the same reference numerals denote the same or corresponding elements.

What is claimed is:

1. A wireless keyboard comprising: an antenna wire for radiating a keyboard output signal into the air from a transmitting sections or radiating the keyboard output signal into the air from the transmitting section and receiving a keyboard input signal radiated into the air at a receiving section;

an insulating electrode sheet having a first electrically conductive patterns coated thereon, each pattern constituting a part of a switch which is turned on by the depression of each key; and a keyboard casing, wherein the antenna wire is formed a second electrically conductive pattern coated on the electrode sheet.

2. A wireless keyboard comprising: an antenna wire for radiating a keyboard output signal into the air from a transmitting section, or radiating the keyboard output signal into the air from the transmitting section and receiving a keyboard input signal radiated into the air at a receiving section;

an insulating electrode sheet having a first electrically conductive patterns coated thereon, each pattern constituting a part of a switch which is turned on by the depression of each key; and a keyboard casing, wherein the antenna wire is formed a second electrically conductive pattern coated on an insulating sheet disposed adjacent to the electrode sheet.

* * * * *